(12) United States Patent
Fukano et al.

(10) Patent No.: US 6,481,459 B2
(45) Date of Patent: Nov. 19, 2002

(54) TWO-WAY VALVE WITH INDICATOR SECTION FOR INDICATING AN ON/OFF STATE OF THE VALVE

(75) Inventors: Yoshihiro Fukano, Ibaraki-ken (JP); Tadashi Uchino, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/899,196

(22) Filed: Jul. 6, 2001

(65) Prior Publication Data

US 2002/0002998 A1 Jan. 10, 2002

(30) Foreign Application Priority Data

Jul. 7, 2000 (JP) .......................................... 2000-206986

(51) Int. Cl.[7] .............................................. F16K 37/00
(52) U.S. Cl. ........................................ 137/554; 137/553
(58) Field of Search ................................. 137/553, 554, 137/556

(56) References Cited

U.S. PATENT DOCUMENTS 5,213,057 A * 5/1993 Müller ..................... 137/553 X
5,647,396 A * 7/1997 Stommes et al. ........... 137/554
5,806,559 A * 9/1998 Takasaka ................. 137/553 X
5,996,636 A  12/1999 Fukano et al.
6,138,712 A * 10/2000 Hirose ..................... 137/556 X

OTHER PUBLICATIONS

Co–pending U.S. patent application Ser. No. 09/899,195, filed Jul. 6, 2001, by Yoshihiro Fukano et al.

Co–pending U.S. patent application Ser. No. 09/899,202, filed Jul. 6, 2001, by Yoshihiro Fukano et al.

* cited by examiner

Primary Examiner—Kevin Lee
(74) Attorney, Agent, or Firm—Paul A. Guss (57) ABSTRACT

A two-way valve has a diaphragm for opening and closing a fluid passage under an action of a pilot pressure. Further, the two-way valve has an indicator section. Displacement of a first rod and a second rod connected to the diaphragm is directly transmitted to the indicator section so that the indicator section can indicate whether the two-way valve is in the ON state where the fluid passage is opened or the two-way valve is in the OFF state where the fluid passage is closed.

8 Claims, 8 Drawing Sheets

FIG. 1

FIG. 2 (OFF STATE)

FIG. 3 (ON STATE)

FIG. 4 (OFF STATE)

FIG. 5

(ON STATE)

(OFF STATE)

FIG. 8 (ON STATE)

TWO-WAY VALVE WITH INDICATOR SECTION FOR INDICATING AN ON/OFF STATE OF THE VALVE

BACKGROUND OF THE INVENTION

1. Field of the Invention

The present invention relates to a two-way valve having a first port and a second port for introducing and discharging pressurized fluid in two directions.

2. Description of the Related Art

Conventionally, two-way valves have been used in fluid pressure circuits or the like. The two-way valve has a first port and a second port for introducing and discharging pressurized fluid, and a fluid passage for communication between the first port and the second port through a valve plug which is operated under a pilot pressure supplied by a pilot port.

Typically, the two-way valve is equipped with detection means such as a sensor for detecting displacement of the valve plug. The detection means supplies detection signals with control means such as a controller, and the control means outputs control signals to indicating means for controlling the indicating means to indicate whether the two-way valve is in the ON state or the two-way valve is in the OFF state, i.e., whether the two-way valve is opened or closed.

However, according to the conventional two-way valve, in order for an operator to confirm whether the two-way valve is in the ON state or the two-way valve is in the OFF state, the detection means such as the sensor for detecting the position of the valve plug and the control means such as the controller for turning on and turning off the indicating means such as an indicator based on the detection signals outputted from the detection means are essential. Therefore, the overall size of the two-way valve tends to be large and the production cost thereof is rather high.

SUMMARY OF THE INVENTION

A general object of the present invention is to provide a two-way valve having an indicator section of simple structure for reducing the overall size of the two-way valve and the number of components in the two-way valve to reduce the production cost.

Another important object of the present invention is to provide a two-way valve having an indicator section of simple structure for allowing an operator to visually confirm whether the two-way valve is in the ON state or the two-way valve is in the OFF state.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Embodiments of the present invention will be described with reference to accompanying drawings.

Figure 1:
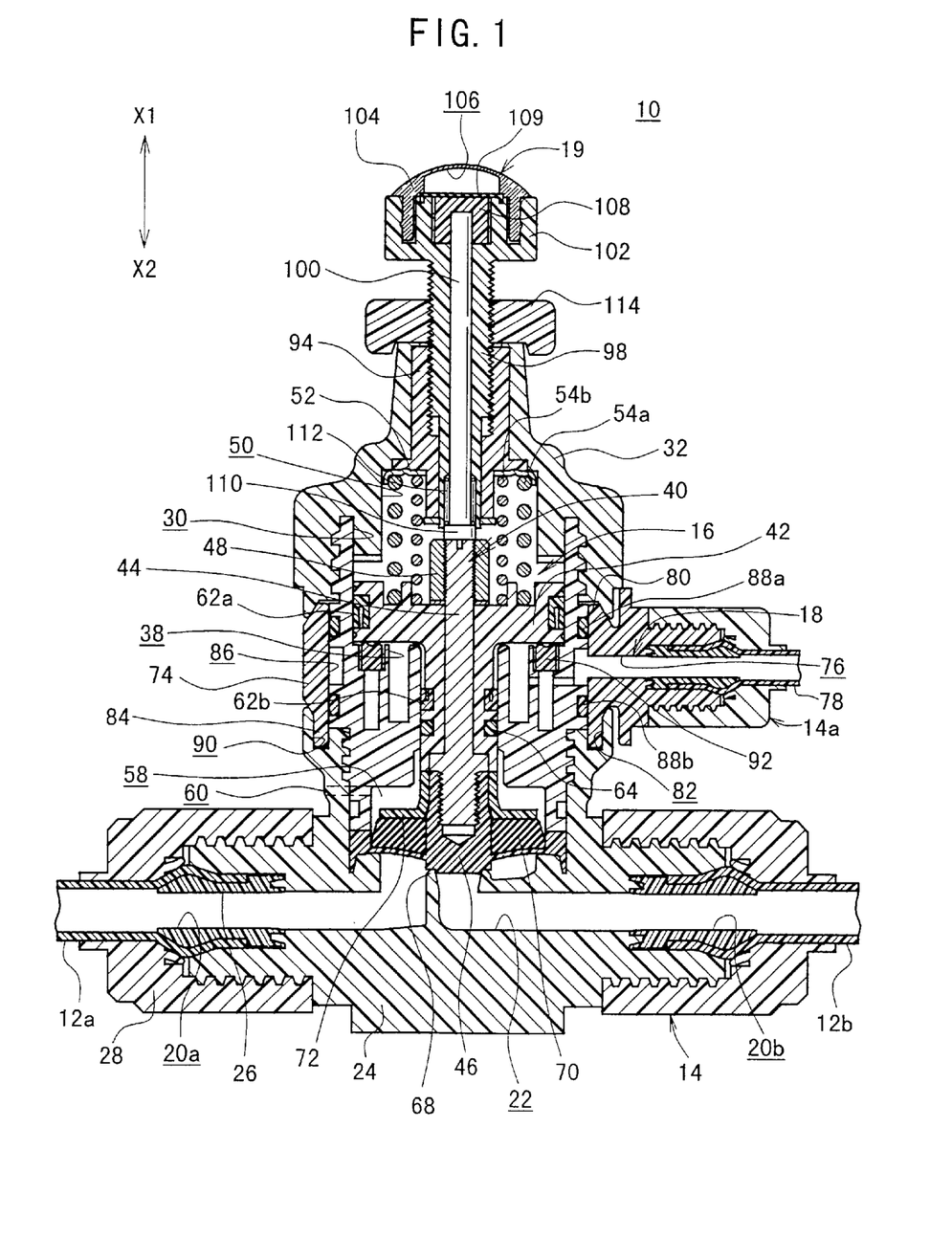
FIG. 1 is a vertical cross sectional view showing a two-way valve according to an embodiment of the present invention.

In FIG. 1, the reference numeral 10 denotes a two-way valve according to an embodiment of the present invention.

The two-way valve 10 basically comprises a joint section 14 detachably connected to a pair of tubes 12a and 12b, a valve mechanism 16 positioned over the joint section 14, a pilot pressure supplying section 18 for supplying a pilot pressure to energize the valve mechanism 16, and an indicator section 19 for indicating whether the two-way valve 10 is opened (ON state) or closed (OFF state).

The joint section 14, the valve mechanism 16, and the pilot pressure supplying section 18, and the indicator section 19 are assembled into a single unit.

The joint section 14 has a first port 20a and a second port 20b defined at its opposite ends, respectively. Further, the joint section 14 comprises a body 24, a pair of inner members 26, and a pair of lock nuts 28. The body 24 has a fluid passage 22 defined therein for communication between the first port 20a and the second port 20b. The inner members 26 engage with the body 24 in the first port 20a and the second port 20b and are inserted in openings of tubes 12a and 12b, respectively. The lock nuts 28 are screwed over threaded portions of the body 24 so as to ensure air-tightness or liquid-tightness at the connecting portions between the tubes 12a and 12b and the inner members 26.

Sealing is effected by engagement between the inner members 26 and other members. The inner members 26 have sealing surfaces substantially parallel to the axial line of the joint section 14. Inclined surfaces of the inner members 26 do not have sealing capability. The structure of the joint section 14 is discussed in detail in the U.S. Pat. No. 5,996,636 filed by the present applicant and the disclosures of which are herein incorporated by reference.

A substantially circular opening 30 is defined on the upper part of the body 24. The opening 30 is closed by a bonnet 32. Further, fixing members (not shown) are attached to the lower part of the body 24 for fixing the two-way valve 10 to another member.

The valve mechanism 16 comprises a displacement mechanism 40 which is displaced along a cylinder chamber 38 in the body 24 in the directions indicated by X1 and X2, for opening and closing the fluid passage 22.

The displacement mechanism 40 comprises a piston 42 having a T-shaped cross section, a first rod 44 inserted in a through hole axially defined in the piston 42, a diaphragm 46, and a nut 48. The diaphragm 46 is connected to one end of the first rod 44 and displaced in unison with the piston 42. The nut 48 is connected to the other end of the first rod 44.

A chamber 50 is formed between the piston 42 and the bonnet 32. A pair of first springs 54a and 54b having different diameters, i.e., an outer spring 54a and an inner spring 54b are disposed in the chamber 50. The lower ends of the first springs 54a and 54b are connected to the upper surface of the piston 42 and the upper ends of the first springs 54a and 54b are seated on a substantially annular spring seat 52. The displacement mechanism 40 including the diaphragm 46 is biased downwardly (in the X2 direction) by the resilient force of the first springs 54a and 54b.

A communication passage (not shown) running substantially parallel to the axis of the first rod 44 is defined in the piston 42 for communication between the chamber 50 and a diaphragm chamber 58. Thus, air in the chamber 50 can be discharged to the outside from a fluid inlet/outlet port 60 as described later on.

The piston 42 comprises a large-diameter portion having an annular groove for attaching a first V-packing 62a and a small-diameter portion having annular grooves for attaching a second V-packing 62b and an O-ring 64.

The diaphragm chamber 58 is formed under the piston 42 and covered by the diaphragm 46. The diaphragm chamber 58 communicates with the outside through the fluid inlet/outlet port 60. Therefore, since the chamber 50 communicates with the diaphragm chamber 58 through the unillustrated communication passage, air in the chamber 50 and the diaphragm chamber 58 can be discharged to the outside from the fluid inlet/outlet port 60.

Further, the fluid inlet/outlet port 60 is connected to a tube or the like through a tube joint (not shown). In this manner, air in the chamber 50 and the diaphragm chamber 58 can be discharged to the outside desirably. That is, the two-way valve 10 according to the present embodiment can be used in a clean room where cleanness condition needs to be maintained since the two-way valve 10 does not pollute the air in the clean room.

The diaphragm 46 is coupled to a lower part of the piston 42 by connecting the diaphragm 46 and the first rod 44. Therefore, the diaphragm 46 is displaced in unison with the first rod 44 and functions as a valve plug. When the diaphragm 46 is spaced from a valve seat 68 to make a clearance between the diaphragm 46 and the valve seat 68, the fluid passage 22 is opened for allowing pressurized fluid (or non-pressurized fluid) to flow in the fluid passage 22. When the diaphragm 46 is seated on the valve seat 68, the fluid passage 22 is closed for interrupting the fluid flow in the fluid passage 22. The supply and suspension of the fluid in the fluid passage 22 can be switched smoothly.

A ring-shaped protection member 70 made of a resilient material such as rubber is provided on the upper surface of the diaphragm 46 for protecting a thin-walled portion of the diaphragm 46. The protection member 70 is supported by a bent support member 72 fixed to a lower part of the first rod 44.

An annular member 74 is disposed between the body 24 and the bonnet 32. The annular member 74 is rotatable circumferentially about the axis of the first rod 44. The annular member 74 has a pilot port 76 which communicates with the cylinder chamber 38. Therefore, the pilot port 76 can be set at an arbitrary position (angle) around the axis of the first rod 44. The pilot port 76 is connected to a tube 78 through a joint section 14a. The joint section 14a has the same structure with a part of the joint section 14, though it has slightly smaller dimensions.

On the upper annular edge of the annular member 74, an annular projection 80 is formed. The annular projection 80 engages with a lower edge of the bonnet 32. On the lower annular edge of the annular member 74, a plurality of protrusions 84 are formed. The protrusions 84 engage with an annular guide groove 82 defined in the outer circumferential surface of the body 24. The protrusions 84 are arranged circumferentially at predetermined intervals. An annular passage 86 in communication with the pilot port 76 is formed circumferentially between the annular member 74 and the body 24. The annular passage 86 is sealed air-tight by a pair of O-rings 88a and 88b.

The body 24 has recesses 90 arranged circumferentially at predetermined intervals (at predetermined degrees about the axis of the piston 42). The respective protrusions 84 of the annular member 74 engage with the recesses 90 for fixing the annular member 74 in position.

A ring-shaped shock absorbing member 92 is fitted in an annual groove of the body 24. The shock absorbing member 92 abuts against the large diameter portion of the piston 42 for absorbing shocks generated when the piston 42 is displaced downwardly.

A substantially cylindrical sleeve 94 for supporting the indicator section 19 is fitted in the opening of the bonnet 32. The indicator section 19 comprises a support member 90, a second rod 100, a transparent lens (see-through member) 104 having a substantially semi-circular cross section, an indicator 108, and a cover member 109. The support member 98 has a threaded portion which is screwed into a female screw portion (through hole) of the sleeve 94. The second rod 100 can be displaced in a through hole in the support member 98. The indicator 108 is disposed in an internal space 106 surrounded by the lens 104 and connected to an end of the second rod 100. Therefore, the indicator 108 is displaced in unison with the second rod 100. The cover member 109 is attached on the upper surface of the support member 98 and covers the indicator 108.

Figure 2:
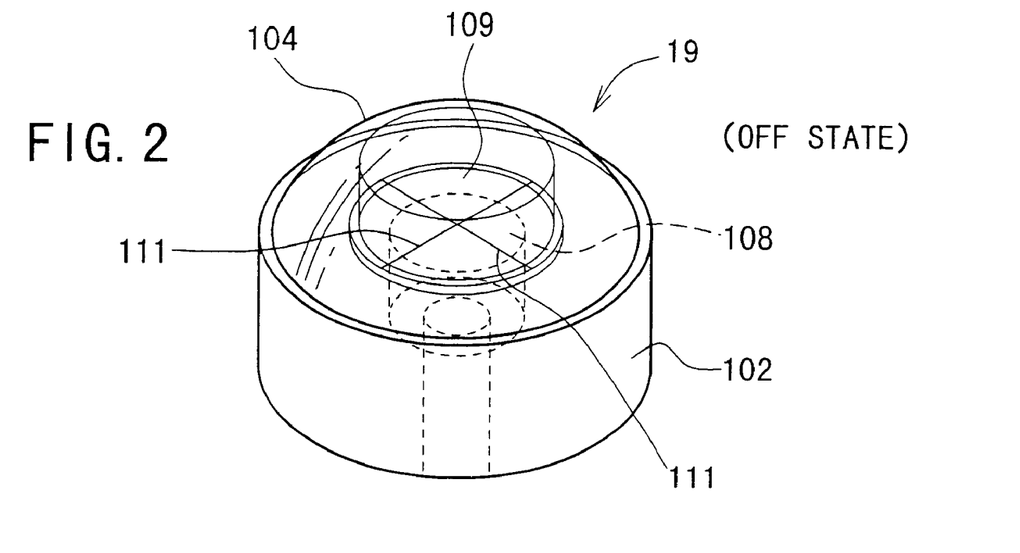
FIG. 2 is a perspective view showing an indicator section of the two-way valve in which the two-way valve is in the OFF state.
Figure 3:
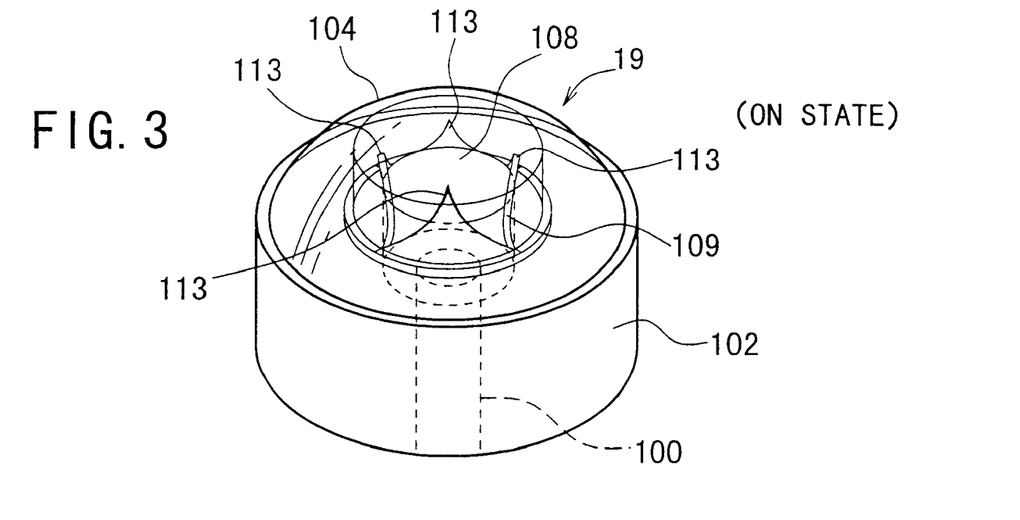
FIG. 3 is a perspective view showing the indicator section of the two-way valve in which the two-way valve is in the ON state.

The cover member 109 is a substantially semi-circular member made of a flexible material such as resin or rubber. As shown in FIGS. 2 and 3, the cover member 109 has cut lines 111 in a crisscross pattern and the cut lines 111 divide the cover member 109 into four cover pieces 113. As shown in FIG. 2, when the two-way valve 10 is in the OFF state, the indicator 108 is positioned in a recess of the support member 98 and hidden by the cover member 109. Therefore, the indicator 108 is not visible in the OFF state.

In contrast, when the two-way valve 10 is in the ON state, as shown in FIG. 3, the indicator 108 is displaced upwardly to push the cover pieces 113. Thus, the cover pieces 113 are bent upwardly to open the cover member 109. In this state, the indicator 108 is partially exposed to the outside. Stated otherwise, the indicator 108 is visible from the outside.

Figure 4:
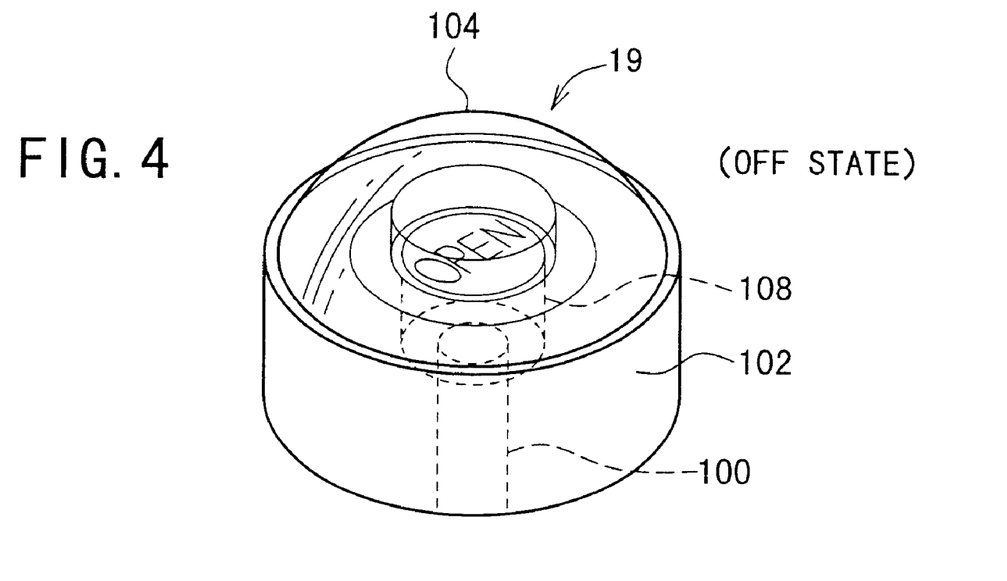
FIG. 4 is a perspective view showing a variation of the indicator section in which the two-way valve is in the OFF state.
Figure 5:
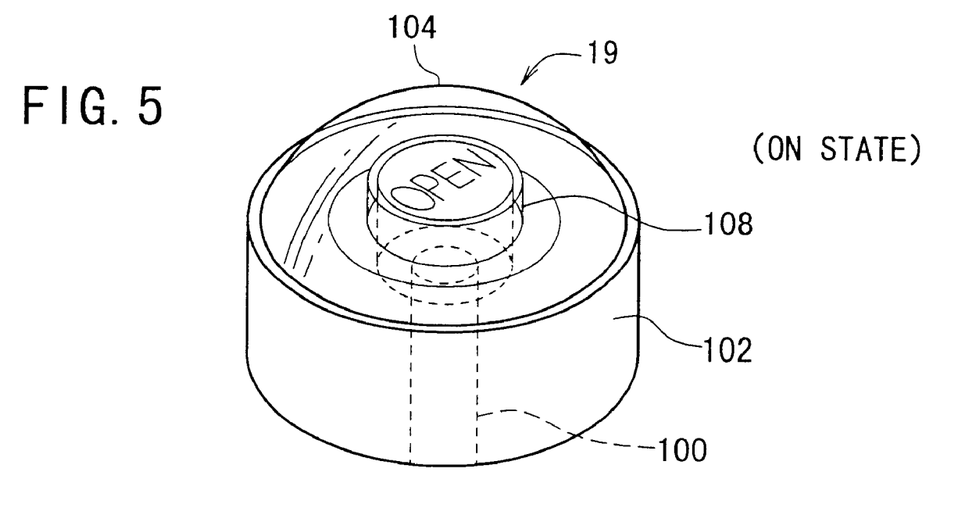
FIG. 5 is a perspective view showing the variation of the indicator section in which the two-way valve is in the ON state.

The indicator 108 may have a fluorescent color or the like so that the indicator 108 can be recognized easily. Instead of using the cover member 109, the indicator 108 may be marked with letters such as "OPEN", or marked with a symbol for indicating the position of the indicator 108. In this manner, it is possible to confirm whether the two-way valve 10 is opened or closed (see FIGS. 4 and 5).

The second rod 100 is an independent member aligned coaxially with the first rod 44 such that an end of the first rod 44 abuts against an end of the second rod 100. The second rod 100 is constantly biased toward the first rod 44 under the resilient force of a second spring 112 fixed to an annular protrusion 110 of the second rod 100. The second spring 112 functions to return the second rod 100 to an initial position.

The indicator section 19 can be displaced in the axial direction of the second rod 100 by screwing the support member 98 in the sleeve 94. The indicator section 19 is fixed at a predetermined position with a lock nut 114 fitted to the support member 98.

According to the present embodiment, the first rod 44, the second rod 100, the nut 48, the spring seat 52, the first springs 54a, 54b, and the second spring 112 are made of a metal such as stainless steel, and the other components of the two-way valve 10 are made of resin. Preferably, surfaces of the first spring 54a, 54b, and the second spring 112 are coated with Teflon (registered trademark of DuPont).

The two-way valve 10 according to the present embodiment is basically constructed as described above. Next, operations and effects of the two-way valve 10 will be described hereinbelow.

In use, the two-way valve 10 is connected to a fluid supply source (not shown) and a fluid device (not shown) through the tubes 12a and 12b connected to the first port 20a and the second port 20b, respectively. For example, the fluid supply source is connected to the first port 20a and the fluid device is connected to the second port 20b. Further, a pressurized air supply source (not shown) is connected to the pilot port 76 through a directional control valve (not shown). As shown in FIG. 2, in the OFF state (when the diaphragm 46 is seated on the valve seat 68 and the fluid passage 22 is closed by the diaphragm 46), the indicator 108 is hidden by the cover 109. Therefore, the indicator 108 is not visible from the outside.

Then, in the OFF state, the pressurized air supply source is energized and a pilot pressure is supplied to the pilot port 76 by the switching action of the directional control valve. When the pilot pressure is supplied from the pilot port 76 to the cylinder chamber 38, the piston 42 is displaced upwardly in opposition to the resilient force of the first springs 54a and 54b.

In this manner, the entire displacement mechanism 40 including the diaphragm 46 is displaced upwardly in unison with the piston 42. When the diaphragm 46 connected to the piston 42 through the first rod 44 is spaced from the valve seat 68 by a predetermined distance, the two-way valve 10 is switched to the ON state (the fluid passage 22 of the two-way valve 10 is opened). Thus, the fluid communication between the first port 20a and the second port 20b through the fluid passage 22 is established. In this state, the fluid supplied from the fluid supply source flows into the first port 20a, flows through the fluid passage 22, and flows out of the second port 20b to the fluid device.

When the displacement mechanism 40 is displaced upwardly, the second rod 100 engaging with the end of the first rod 44 is displaced upwardly in unison with the piston 42 in opposition to the resilient force of the second spring 112. Therefore, the indicator 108 attached to the end of the second rod 100 is displaced upwardly in unison with the second rod 100. The indicator 108 pushes the cover pieces 113 of the cover 109 having the cut lines 111 to bent the cover pieces 113 upwardly such that the indicator 108 is partially exposed to the outside (see FIG. 3). Accordingly, if an operator can visually recognize the indicator 108 exposed from the cover member 109 through the transparent lens 104, the operator easily confirms that the two-way valve 10 is in the ON state, i.e., the two-way valve 10 is opened and the fluid communication in the fluid passage 22 is established.

Then, the supply of the pilot pressure to the pilot port 76 is interrupted by the switching action of the directional control valve. Thus, the pressure in the cylinder chamber 38 is decreased. As a result, the piston 42 is displaced downwardly by the resilient force of the first springs 54a and 54b. When the diaphragm 46 is seated on the valve seat 68, the two-way valve 10 is switched to the OFF state, i.e., the two-way valve 10 is closed.

At this time, the second rod 100 is displaced in unison with the first rod 44 and the piston 42 by the resilient force of the second spring 112. As a result, the indicator 108 attached to the end of the second rod 100 is displaced downwardly and hidden by the cover member 109 (see FIG. 2).

Accordingly, if an operator cannot visually recognize the indicator 108 through the transparent lens 104, the operator easily confirms that the two-way valve 10 is in the OFF state, i.e., the two-way valve 10 is closed and the fluid communication in the fluid passage 22 is interrupted.

When the piston 42 is displaced downwardly, the large-diameter portion of the piston 42 abuts against the ring-shaped shock absorbing member 92 and the shock generated by the abutment is absorbed by the shock absorbing member 92. Accordingly, it is possible to reduce vibrations generated when the diaphragm 46 is seated on the valve seat 68.

According to the present embodiment, the indicator section 19 having a simple structure is provided. The indicator 108 of the indicator section 19 is displaced in unison with the diaphragm 56 functioning as the valve plug. Therefore, the operator can confirm the condition of the two-way valve 10 easily and reliably by checking whether the indicator 108 is visible or not. If the indicator 108 is exposed from the cover member 109 and visible from the outside through the transparent lens 104, the two-way valve 10 is in the ON state, (the two-way valve 10 is opened). In contrast, if the indicator 108 is hidden by the cover member 109 and invisible from the outside, the two-way valve 10 is in the OFF state, (the two-way valve 10 is closed).

Therefore, according to the two-way valve 10 of the present embodiment, detecting means such as a sensor for detecting the position of the valve plug, and control means such as a controller for inputting detection signals from the detection means are not necessary. Accordingly, it is possible to make the apparatus much more compact, and reduce the number of components in the apparatus for reducing the production cost.

Further, since the indicator section 19 is provided in the upper part of the two-way valve 10, the displacement condition of the indicator 108 can be checked easily. Accordingly, it is possible to confirm whether the two-way valve 10 is in the OFF state or in the ON state.

Further, according to the present embodiment, the annular member 74 is rotatable about the axis of the first rod 44. Therefore, it is possible to change the position of the pilot port 76 circumferentially. Thus, the direction of the pilot port 76 can be changed desirably by rotating the annular member 74. Since the position of the pilot port 76 can be changed depending on the place for installing the two-way valve 10, piping operations can be performed easily and directions of pipes can be changed freely. Accordingly, the usability of the two-way valve 10 is greatly improved.

Furthermore, according to the present embodiment, the rod 44, the nut 48, the spring seat 52, the springs 54a and 54b are made of a metal such as stainless steel, for example, while all the other components are made of a resin material. Accordingly, even if a certain chemical is used as fluid, the chemical will be prevented from being reformed since the chemical will not contact with any metal materials.

Figure 6:
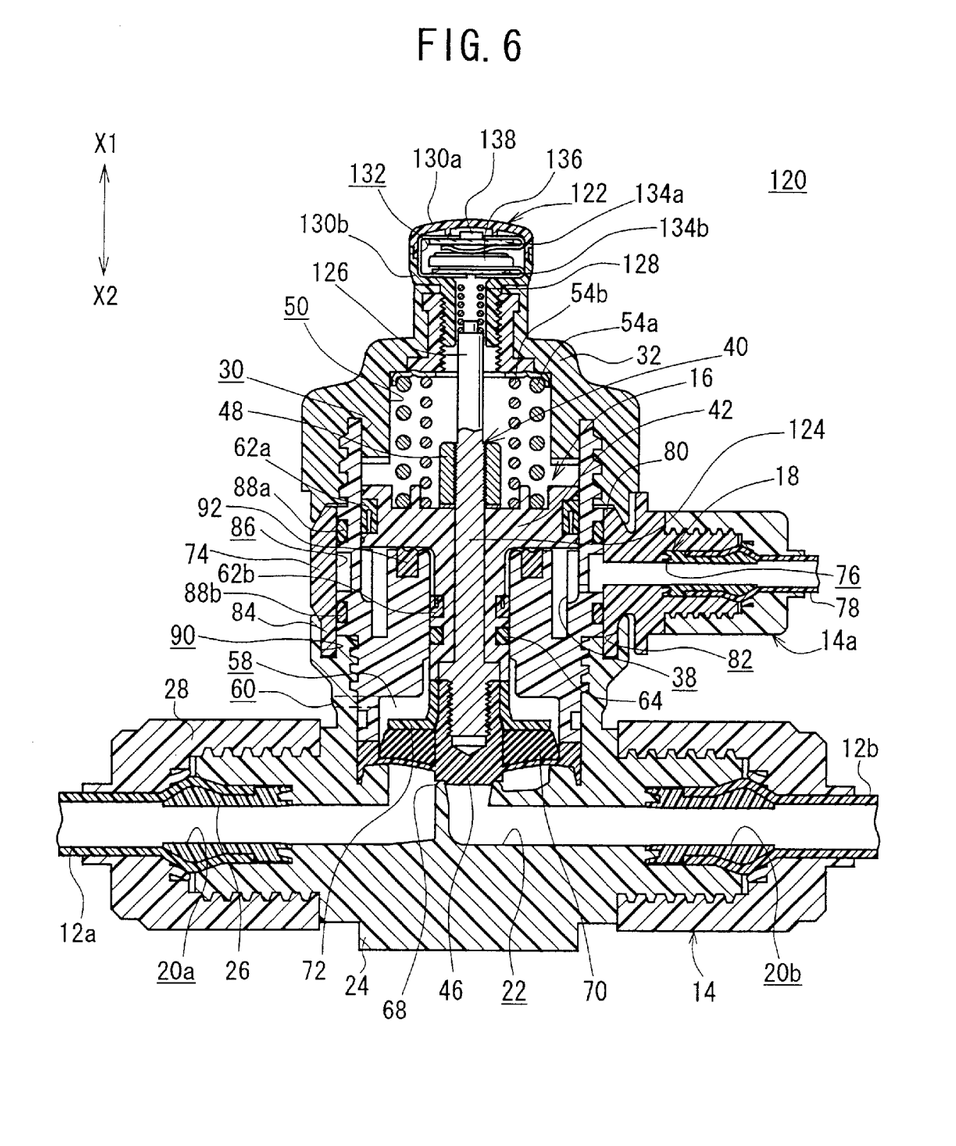
FIG. 6 is a vertical cross sectional view showing a two-way valve according to another embodiment of the present invention.

Next, the two-way valve 120 according to another embodiment will be described with reference to FIG. 6.

According to the two-way valve 10 shown in FIG. 1, the indicator 108 of the indicator section 19 is displaced upwardly and downwardly for mechanically indicating whether the two-way valve 10 is in the ON state or in the OFF state. In contrast, according to the two-way valve 120 shown in FIG. 6, an LED indicator 122 electrically indicates whether the two-way valve 10 is in the ON state or in the OFF state. In FIG. 6, the constituent elements of the two-way valve 120 that are identical to those elements of the two-way valve 10 shown in FIG. 1 are labeled with the same reference numeral, and description thereof is omitted.

The two-directional valve 120 comprises an elongated rod 124 having a free end 126 oriented to the LED indicator section 122. One end of a spring 128 is fixed to a protrusion formed on the free end 126 of the rod 124. Thus, the spring 128 is displaced upwardly and downwardly in unison with the free end 126 of the rod 124. The spring 128 is made of an electrically conductive material and functions as a switching mechanism. The other end of the spring 128 is free from engagement of other members thereto.

The LED indicator section 122 comprises a first housing 130a and a second housing 130b which are made of a light-transmissive material and assembled into a single unit. A coin-shaped battery 136, an LED element (light emitting means) 138, and a pair of insulation members 134a and 134b made of an electrically non-conductive material are disposed in an inner space 132 defined by the first housing 130a and the second housing 130b. The coin-shaped battery 136 and the LED element 138 are disposed at a predetermined spacing distance.

Figure 7:
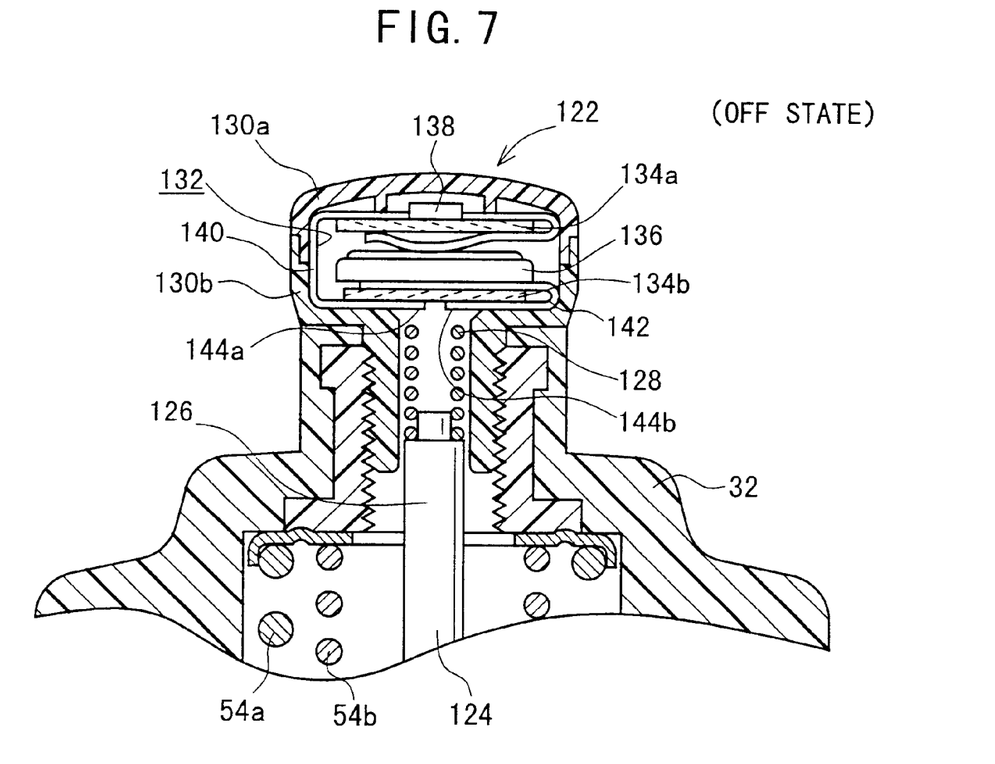
FIG. 7 is a vertical cross sectional view showing a portion including an LED indicator section of the two-way valve in FIG. 6 in which the two-way valve is in the OFF state.

The LED element 138 of the LED indicator section 122 has a first terminal 140 for connection to one electrode of the coin-shaped battery 136, and a second terminal 142 for connection to the other electrode of the coin-shaped battery 136. In FIG. 7, the end 144a of the first terminal 140 and the end 144b of the second terminal are spaced form each other. Therefore, the terminal 140 and the second terminal 142 are not electrically in contact with each other, and no light is emitted from the LED element 138.

Figure 8:
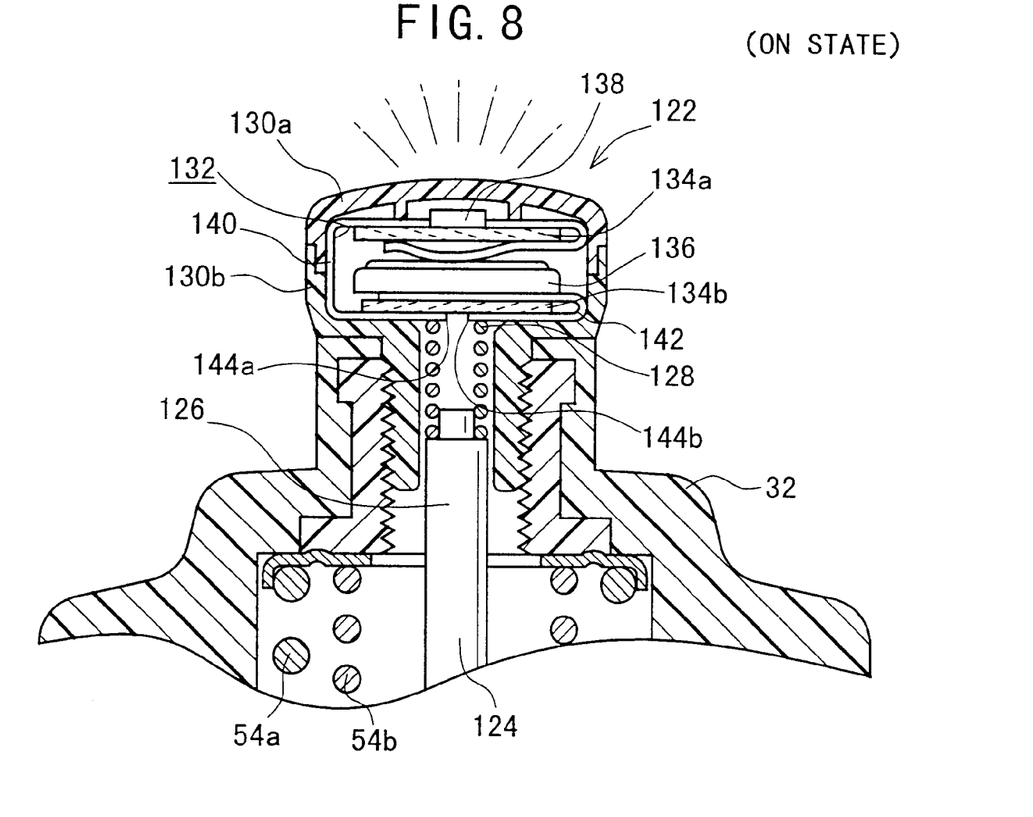
FIG. 8 is a vertical cross sectional view showing the portion including the LED indicator section of the two-way valve in FIG. 6 in which the two-way valve is in the ON state.

When a pilot pressure is supplied to the two-way valve 120, a diaphragm 46, a piston 42, and a rod 124 are displaced upwardly. When the spring 128 fixed to the end of the rod 124 is displaced upwardly, the free end of the spring 128 is brought in contact with the end 144a of the first terminal 140 and the end 144b of the second terminal 142 as shown in FIG. 8. Thus, the first terminal 140 is electrically brought in contact with the second terminal 142 and light is emitted from the LED element 138. Stated otherwise, the spring 128 connected to the diaphragm 46 through the rod 124 is displaced in unison with the diaphragm 46 and functions as a switch to control the electric conductance between the first terminal 140 and the second terminal 142, thereby turning on and off the LED element 138.

Accordingly, if an operator can not visually recognize the light emission from the LED element 138, the operator easily confirms that the two-way valve 120 is in the OFF state. If an operator can visually recognize the light emission from the LED element 138 which is caused by the upward displacement of the spring 128 in unison with the diaphragm 46, the operator easily confirms that the two-way valve 120 is in the ON state.

According to the two-way valve 120 of the above-described embodiment, the LED indicator section 122 having a simple electric structure is provided. Accordingly, the operator can visually confirm whether the two-way valve 120 is in the OFF state or in the OFF state, i.e., whether the two-way valve 120 is closed or opened.

Since operations and effects of the two-way valve 120 are same with those of the two-way valve 10, description thereof is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A two-way valve comprising:

a joint section having a first port at one end, and a second port at the other end, and a fluid passage for communication between said first port and said second port;

a valve mechanism having a displacement mechanism including a valve plug connected to one end of a rod for opening and closing said fluid passage; and an indicator section including an indicator directly connected to another end of said rod and displaced in unison with said rod, wherein linear movement of said rod connected at respective ends to said valve plug and said indicator is directly transmitted to said indicator section so that said indicator section can indicate whether said two-way valve is in the ON state where said fluid passage is opened or said two-way valve is in the OFF state where said fluid passage is closed.

2. A two-way valve according to claim 1, wherein said indicator section includes an indicator which is displaced upwardly and downwardly when linear movement of said rod is directly transmitted to said indicator section so that said indicator can indicate whether said two-way valve is in the ON state or said two-way valve is in the OFF state.

3. A two-way valve according to claim 1, wherein said indicator section includes a see-through member for surrounding said indicator and allowing displacement of said indicator to be seen from the outside, and a spring fixed to said rod for returning said rod to an initial position.

4. A two-way valve according to claim 3, wherein said indicator section includes a cover member having cut lines, said cover member covers said indicator in the OFF state so that said indicator can not be seen from the outside, and said cover member allows said indicator to be exposed through said cut lines in the ON state so that said indicator can be seen from the outside.

5. A two-way valve according to claim 1, wherein said indicator section includes a switching mechanism for opening and closing an electric circuit when linear movement of said rod is directly transmitted to said indicator section, and a light-emitting element for emitting light when said electric circuit is closed by said switching mechanism.

6. A two-way valve according to claim 5, wherein said switching mechanism includes a spring fixed to an end of said rod and said light-emitting element has a first terminal and a second terminal, said first terminal and said second terminal being spaced at a predetermined distance and electrically connected when a free end of said spring is connected to said first terminal and said second terminal under a displacement action of said rod.

7. A two-way valve comprising:

a joint section having a first port at one end, and a second port at the other end, and a fluid passage for communication between said first port and said second port;

a valve mechanism having a displacement mechanism including a valve plug for opening and closing said fluid passage; and an indicator section, wherein linear movement of a rod connected to said valve plug is directly transmitted to said indicator section so that said indicator section can indicate whether said two-way valve is in the ON state where said fluid passage is opened or said two-way valve is in the OFF state where said fluid passage is closed, and wherein said indicator section includes a switching mechanism for opening and closing an electric circuit when linear movement of said rod is directly transmitted to said indicator section, and a light-emitting element for emitting light when said electric circuit is closed by said switching mechanism, said switching mechanism comprising a contact member fixed to an end of said rod and said light-emitting element has a first terminal and a second terminal, said first terminal and said second terminal being spaced at a predetermined distance and being electrically connected when a free end of said contact member is brought into contact with said first terminal and said second terminal under a displacement action of said rod.

8. A two-way valve according to claim 7, wherein said contact member comprises a spring fixed to an end of said rod, said first terminal and said second terminal being electrically connected when a free end of said spring is brought into contact with said first terminal and said second terminal under a displacement action of said rod.

* * * * *